(12) United States Patent
Matsueda et al.

(10) Patent No.: US 10,725,811 B2
(45) Date of Patent: Jul. 28, 2020

(54) NON-TRANSITORY COMPUTER-READABLE STORAGE MEDIUM RECORDING PROGRAM FOR APPLYING LICENSE TO GENERATED VIRTUAL MACHINE, CONTROL METHOD, AND INFORMATION PROCESSING APPARATUS

(71) Applicant: FUJITSU LIMITED, Kawasaki-shi, Kanagawa (JP)

(72) Inventors: Tomoya Matsueda, Shizuoka (JP); Yoshiro Tsuji, Shizuoka (JP); Hisashi Tandokoro, Yaizu (JP); Akio Ishii, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 15/925,090

(22) Filed: Mar. 19, 2018

(65) Prior Publication Data

US 2018/0276023 A1     Sep. 27, 2018

(30) Foreign Application Priority Data

Mar. 24, 2017    (JP) .................................. 2017-060016

(51) Int. Cl.
*G06F 9/455*     (2018.01)
*G06F 21/10*     (2013.01)
*G06Q 30/04*     (2012.01)

(52) U.S. Cl.
CPC .......... *G06F 9/45558* (2013.01); *G06F 21/10* (2013.01); *G06F 21/105* (2013.01); *G06Q 30/04* (2013.01); *G06F 2009/4557* (2013.01); *G06F 2009/45562* (2013.01); *G06F 2009/45591* (2013.01)

(58) Field of Classification Search
CPC .... G06F 9/45558; G06F 21/10; G06F 21/105; G06F 2009/4557; G06F 2009/45562; G06F 2009/45591; G06Q 30/04
See application file for complete search history.

(56) References Cited

U.S. PATENT DOCUMENTS

| 2010/0293619 A1 | 11/2010 | Hayami |
| 2013/0124353 A1* | 5/2013 | Dhoolia ............. G06Q 10/0631 705/26.1 |
| 2017/0063722 A1* | 3/2017 | Cropper ................. H04L 47/82 |

FOREIGN PATENT DOCUMENTS

| JP | 2010-267009 | 11/2010 |
| JP | 2014-056290 | 3/2014 |
| WO | 2015/019416 | 2/2015 |

* cited by examiner

*Primary Examiner* — Sisley N Kim
(74) *Attorney, Agent, or Firm* — Fujitsu Patent Center

(57) ABSTRACT

A non-transitory computer-readable storage medium storing a program that causes a computer to execute a process, the process including generating a virtual machine when a processing load regarding one or more virtual machines on which a software runs exceeds a threshold, determining whether a number of first type licenses of the software used for the one or more virtual machines is less than a predetermined number, the first type licenses being flat-rate licenses for a given period or permanently, obtaining a second type license of the software when the number of first type licenses is no less than the predetermined number, the second type license being a pay-for-use billing license, and applying the second type license to the generated virtual machine.

5 Claims, 14 Drawing Sheets

FIG.7
SOFTWARE: 002
BILLING TYPE: BYOL
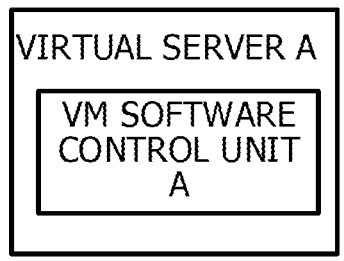
↓ SCALE-OUT
SOFTWARE: 002
BILLING TYPE: BYOL
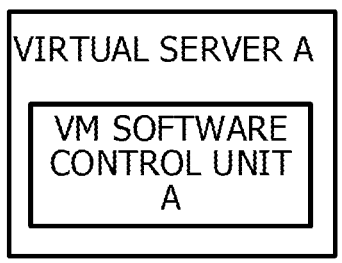
SOFTWARE: 002
BILLING TYPE: PAY-FOR-USE BILLING
(HOURLY AMOUNT)
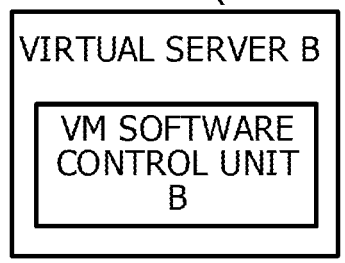
↓ SCALE-IN
SOFTWARE: 002
BILLING TYPE: BYOL
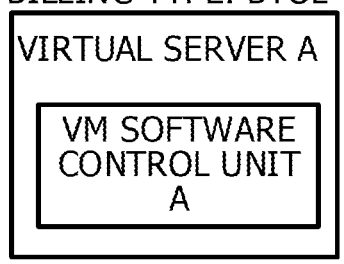

FIG. 8
SOFTWARE: 002
BILLING TYPE: PAY-FOR-USE BILLING
(MONTHLY AMOUNT)
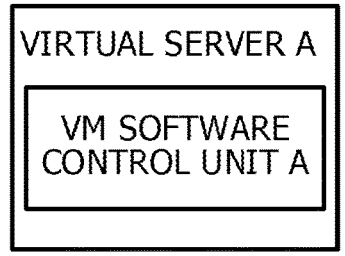
↓ SCALE-OUT
SOFTWARE: 002                          SOFTWARE: 002
BILLING TYPE: PAY-FOR-USE BILLING      BILLING TYPE: PAY-FOR-USE BILLING
(MONTHLY AMOUNT)                       (HOURLY AMOUNT)
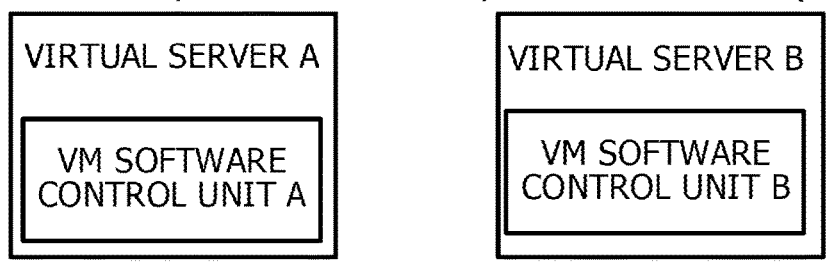
↓ VIRTUAL SERVER B IS PREFERENTIALLY SCALED IN
SOFTWARE: 002
BILLING TYPE: PAY-FOR-USE BILLING
(MONTHLY AMOUNT)
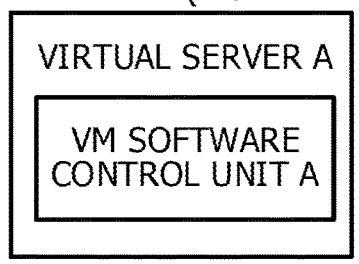

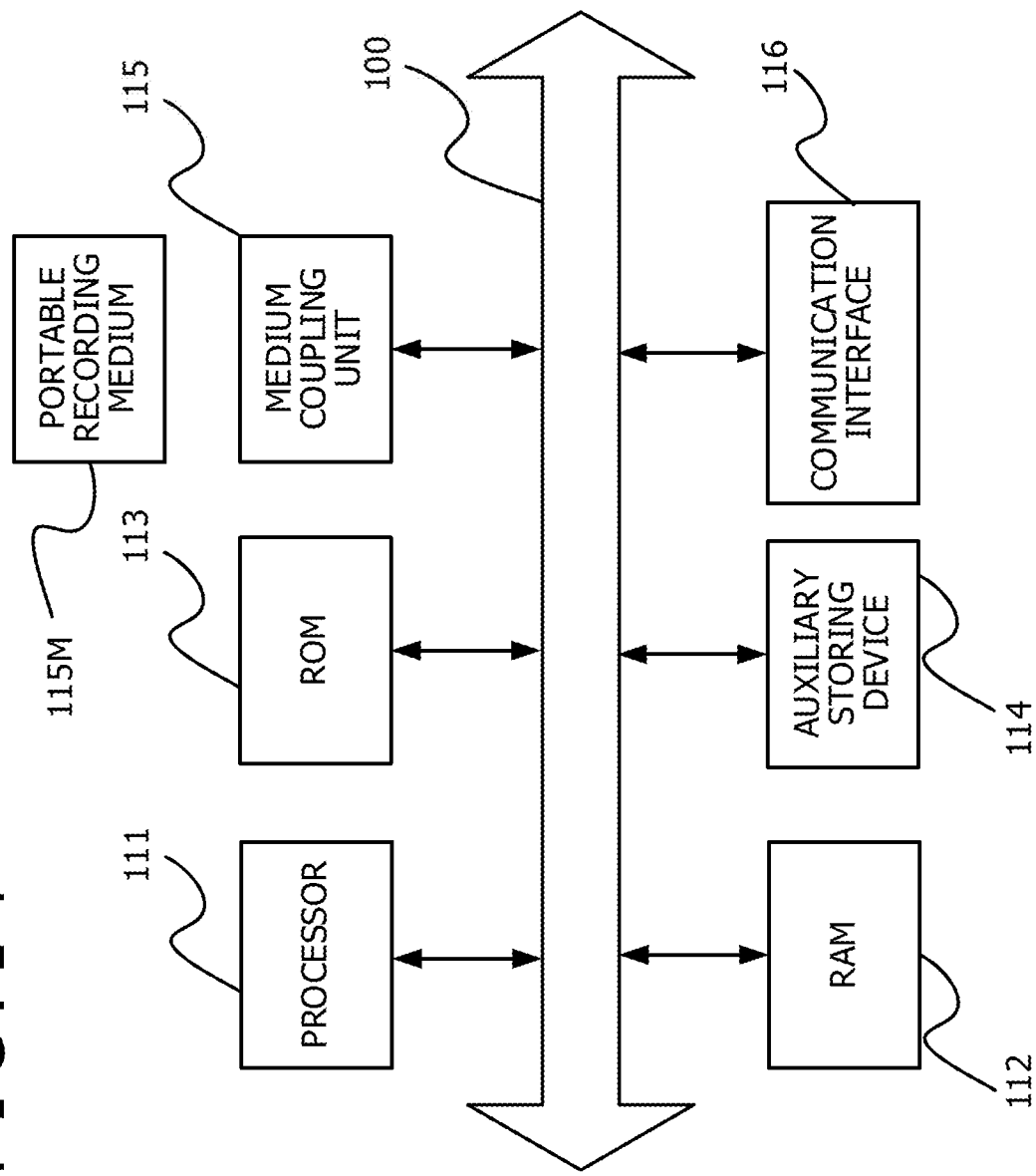

(12)United States Patent 10,725,811 B2

NON-TRANSITORY COMPUTER-READABLE STORAGE MEDIUM RECORDING PROGRAM FOR APPLYING LICENSE TO GENERATED VIRTUAL MACHINE, CONTROL METHOD, AND INFORMATION PROCESSING APPARATUS

CROSS-REFERENCE TO RELATED APPLICATION

This application is based upon and claims the benefit of priority of the prior Japanese Patent Application No. 2017-60016, filed on Mar. 24, 2017, the entire contents of which are incorporated herein by reference.

FIELD

The embodiments discussed herein are related to a non-transitory computer-readable storage medium, a control method, and an information processing apparatus.

BACKGROUND

For example, infrastructure as a service (IaaS) exists as one of use forms of cloud computing services using virtualization techniques. In virtual machines (virtual servers) offered in the IaaS, given software may be used.

Software that operates on the virtual server offered by a service infrastructure of the IaaS or the like is permitted to be used based on a given license.

As a related art, there has been proposed a technique that ensures a license management technique of application vendors in virtual environments and cloud environments (for example, refer to International Publication Pamphlet No. WO 2015/019416).

Furthermore, there has been proposed a technique that enables counting of licenses that may be simultaneously used in an environment in which billing methods mixedly exist or an environment in which a license dynamically changes in the whole system including a virtual server (for example, refer to Japanese Laid-open Patent Publication No. 2010-267009).

Moreover, there has been proposed a technique by which tracking and management are carried out from a reseller perspective regarding copying of a virtual operating system (OS) and so forth and simultaneously new services are offered based on application of license management (for example, refer to Japanese Laid-open Patent Publication No. 2014-56290).

SUMMARY

According to an aspect of the embodiments, a non-transitory computer-readable storage medium storing a program that causes a computer to execute a process, the process including generating a virtual machine when a processing load regarding one or more virtual machines on which a software runs exceeds a threshold, determining whether a number of first type licenses of the software used for the one or more virtual machines is less than a predetermined number, the first type licenses being flat-rate licenses for a given period or permanently, obtaining a second type license of the software when the number of first type licenses is no less than the predetermined number, the second type license being a pay-for-use billing license, and applying the second type license to the generated virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating one example of auto-scaling (first example);

FIG. 8 is a diagram illustrating one example of auto-scaling (second example);

FIG. 14 is a diagram illustrating one example of a hardware configuration of a service infrastructure.

DESCRIPTION OF EMBODIMENTS

For example, if the load on a virtual server that operates in a service infrastructure becomes high, a new virtual server is generated through scale-out of the virtual server and load balancing is intended.

If a new virtual server is generated by scale-out, in order to operate software on this virtual server, a different license from the license of software that operates on a virtual server before the scale-out is applied.

Depending on the number of licenses permitted to be used in advance, the license applied to the software operated on the virtual server newly generated according to the scale-out is lacking in some cases. If the license of this software is lacking, it becomes difficult to continuously use the software on the newly-generated virtual server.

As one aspect, the embodiments discussed herein intend to implement continuous use of software even when deficiency of the license of the software occurs due to scale-out of a virtual machine.

<One Example of System of Embodiment>

Figure 1:
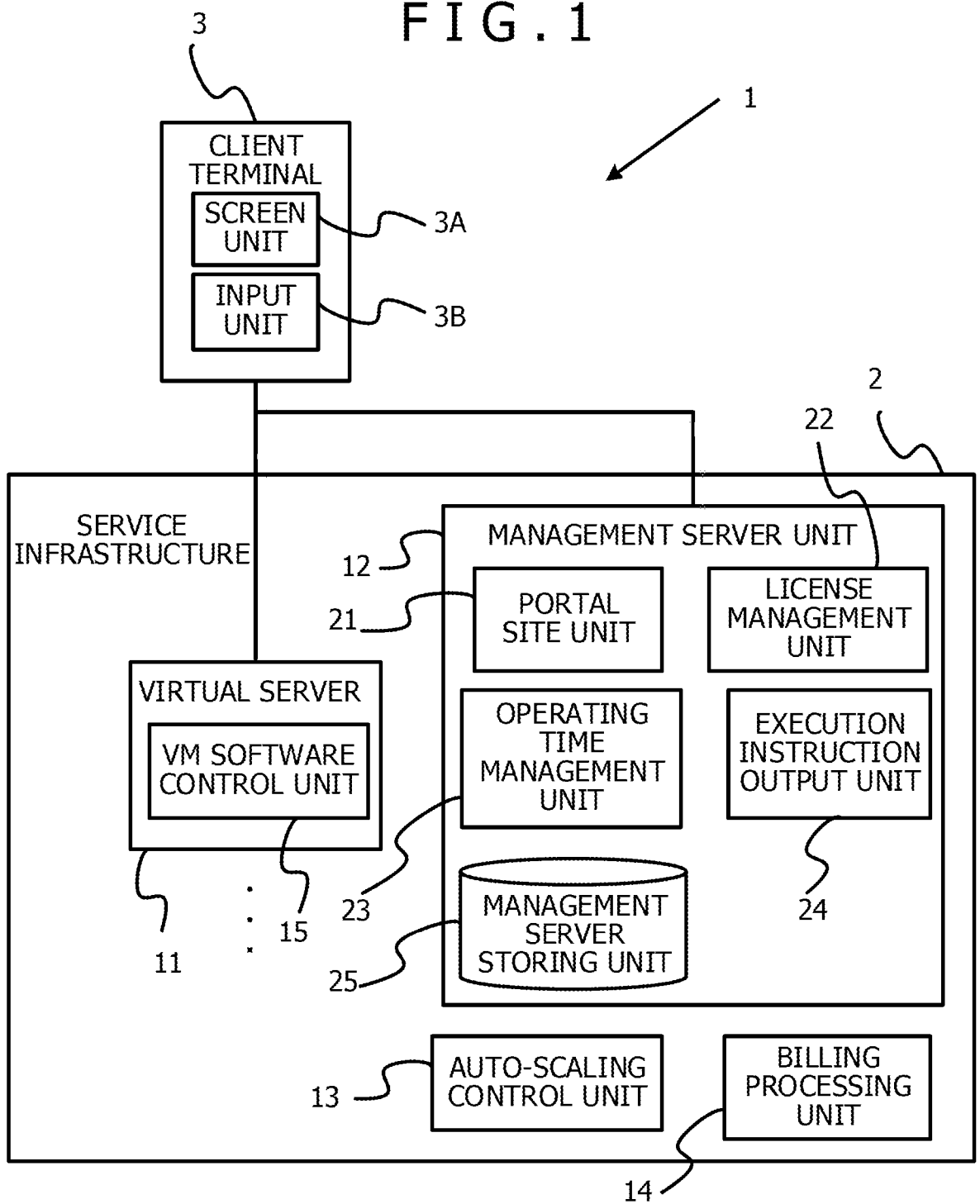
FIG. 1 is a diagram illustrating one example of an overall configuration of a system.

An embodiment will be described below with reference to the drawings. FIG. 1 illustrates one example of a system of an embodiment. In a system 1 of the embodiment illustrated in FIG. 1, a service infrastructure 2 and a client terminal 3 are coupled through a network.

The service infrastructure 2 is an information processing apparatus (computer) that offers a cloud computing service such as IaaS. The client terminal 3 is a terminal that uses the service offered in the service infrastructure 2 through the network. The service infrastructure 2 may offer a service to plural client terminals 3.

The client terminal 3 includes a screen unit 3A and an input unit 3B. The screen unit 3A is a display provided in the client terminal 3, for example, and displays given information. The input unit 3B is provided in the client terminal 3 in order to input given information. The input unit 3B may be separate apparatuses (keyboard, mouse, and so forth) coupled to the client terminal 3.

The service infrastructure 2 includes a virtual server 11, a management server unit 12, an auto-scaling control unit 13, and a billing processing unit 14. The virtual server 11 is a server using a virtualization technique and is implemented by a given program executed by the service infrastructure 2. The virtual server is referred to also as virtual machine (VM).

The client terminal 3 accesses the service infrastructure 2 through the network and thereby may use the virtual server 11 that operates in the service infrastructure 2 and given software that operates on the virtual server 11.

Plural virtual servers 11 are often generated in the service infrastructure 2 and one client terminal 3 uses plural virtual servers 11 in some cases. Furthermore, the number of pieces of software that may be used on one virtual server 11 may be a plural number.

The virtual server 11 includes a VM software control unit 15. The VM software control unit 15 has various kinds of functions. For example, the VM software control unit 15 recognizes unique VM identification (VMID) allocated to each virtual server 11.

The VM software control unit 15 has a function of displaying a list of pieces of software that may be used on the virtual server 11 and a function of installing software. Furthermore, the VM software control unit 15 has a function of uninstalling (deleting) software that is being currently used and a function of notifying the use status of software to the management server unit 12.

The management server unit 12 carries out various kinds of management in the service infrastructure 2. The management server unit 12 includes a portal site unit 21, a license management unit 22, an operating time management unit 23, an execution instruction output unit 24, and a management server storing unit 25.

The portal site unit 21 controls access from the client terminal 3. For example, the portal site unit 21 executes login processing in response to a request from the client terminal 3. After this login processing succeeds, the client terminal 3 is permitted to use the virtual server 11 identified based on the VMID.

When the login from the client terminal 3 succeeds, the portal site unit 21 may cause a list of pieces of software that may be used on the respective virtual servers 11 to be displayed on the screen unit 3A of the client terminal 3.

As described above, the client terminal 3 may access the virtual server 11 and use software that operates on the virtual server 11. In the embodiment, the VM software control unit 15 of the virtual server 11 executes an installer of the software and thereby the software is installed on the virtual server 11. This enables the software to be used on the virtual server 11.

Furthermore, if the VM software control unit 15 of the virtual server 11 carries out uninstallation of software in response to operation from the client terminal 3, the software is deleted from the virtual server 11. The VM software control unit 15 notifies the uninstallation of the software to the management server unit 12.

The license management unit 22 carries out license management of software about the virtual server 11. The license management unit 22 carries out license management of software for each virtual server 11. The license management unit 22 is one example of a determining unit.

Suppose that, in the embodiment, two kinds of licenses, Bring Your Own License (BYOL) and pay-for-use billing license, exist as the license of software.

The BYOL is a license purchased by a user, and use of software according to the BYOL is permitted through registration of this BYOL in the management server unit 12. The number of BYOLs registered in the management server unit 12 may be one or may be two or more. Suppose that the BYOL is a flat-rate license in the embodiment.

The BYOL may be a flat-rate license with which use of software is permitted for a given period (for example, in units of year). Furthermore, the BYOL may be a license with which use of software is permitted permanently. The flat-rate license is a license that does not depend on the use time of software.

The pay-for-use billing license is a license with which billing is carried out according to the use time of software. The pay-for-use billing license is a license with which billing is carried out every time the use time of software surpasses a time prescribed in advance (prescribed time).

Suppose that two kinds of pay-for-use billing licenses, long-term pay-for-use billing license and short-term pay-for-use billing license, exist in the embodiment. Three or more kinds of pay-for-use billing licenses may exist. In the following, description will be made based on the assumption that the long-term pay-for-use billing license is a monthly-amount pay-for-use billing license and the short-term pay-for-use billing license is an hourly-amount pay-for-use billing license.

The monthly-amount pay-for-use billing license is a license with which billing for a given amount is carried out every time the use time of software surpasses one month. The hourly-amount pay-for-use billing license is a license with which billing for a given amount is carried out every time the use time of software surpasses one hour.

Suppose that, in the embodiment, the license fee of the BYOL is the highest and the fee of the monthly-amount pay-for-use billing license is the second highest and the fee of the hourly-amount pay-for-use billing license is the lowest.

Suppose that the billing amount when software is used for one month based on the hourly-amount pay-for-use billing license is equal to or higher than the billing amount when the software is used for one month based on the monthly-amount pay-for-use billing license.

The operating time management unit 23 manages the operating time of the virtual server 11. The execution instruction output unit 24 outputs an execution instruction about billing processing to the billing processing unit 14 based on control by the license management unit 22. The execution instruction output unit 24 is one example of an output unit.

The management server storing unit 25 stores various kinds of information. The management server storing unit 25 is one example of a storing unit.

The auto-scaling control unit 13 carries out automatic control relating to scale-out and scale-in of the virtual server 11. The scale-out is processing of newly generating the virtual server 11 and the scale-in is processing of deleting the virtual server 11.

In the embodiment, if the load on the virtual server 11 surpasses a given threshold, the auto-scaling control unit 13 carries out control of scaling out the virtual server 11. For example, the auto-scaling control unit 13 carries out control of scaling out the virtual server 11 if the usage rate a central processing unit (CPU) allocated to the virtual server 11, the usage rate of a memory, or the like surpasses a given threshold.

For example, the load on the virtual server 11 (for example, CPU load) becomes high when access concentrates on software that operates on the virtual server 11. The auto-scaling control unit 13 scales out the virtual server 11 in response to excess of the CPU load over the threshold and thereby load balancing is intended with the plural virtual servers 11.

For example, a large load is imposed on the CPU if the degree of access concentration on the virtual server 11 is high. In this case, the auto-scaling control unit 13 may scale out plural virtual servers 11. Load balancing is intended with the virtual server 11 before the scale-out and the plural virtual servers 11 newly generated.

Furthermore, if the access to the virtual server 11 is reduced, the total load on the virtual server 11 before the scale-out and the virtual server 11 newly generated becomes lower. If this total load becomes equal to or lower than the threshold, the auto-scaling control unit 13 deletes the new virtual server 11 generated by the scale-out. This deletion is referred to as scale-in.

The billing processing unit 14 executes processing of the above-described pay-for-use billing. The execution instruction output unit 24 outputs an execution instruction of the pay-for-use billing processing to the billing processing unit 14. The billing processing unit 14 executes the pay-for-use billing processing based on this execution instruction.

For example, when software with use of a monthly-amount pay-for-use billing license is used for one month, the license management unit 22 carries out control about the pay-for-use billing processing based on the monthly-amount pay-for-use billing license. The execution instruction output unit 24 outputs an execution instruction of the monthly-amount pay-for-use billing processing to the billing processing unit 14 based on this control.

Furthermore, when software with use of an hourly-amount pay-for-use billing license is used for one hour, the license management unit 22 carries out control about the pay-for-use billing processing based on the hourly-amount pay-for-use billing license. The execution instruction output unit 24 outputs an execution instruction of the hourly-amount pay-for-use billing processing to the billing processing unit 14 based on this control.

For example, when carrying out billing based on a pay-for-use billing license, the billing processing unit 14 may transmit a notification indicating that charging based on the billing will be carried out to the client terminal 3.

For example, if a payment measure for the pay-for-use billing license set on each user basis is registered in the management server unit 12, the billing processing unit 14 may execute billing processing by using the registered payment measure.

As described above, the billing processing unit 14 executes billing processing according to the use time of software. In the embodiment, the above-described billing processing is decided based on the operating time of the virtual server 11 or the operating time of software. The above-described execution instruction includes information according to the operating time of the virtual server 11 or the operating time of software.

For example, if the virtual server 11 is newly generated by scale-out, the operating time management unit 23 manages the elapsed time from the operation start clock time of the newly-generated virtual server 11 as the operating time of the virtual server 11.

If the new virtual server 11 is generated according to scale-out, a VMID that has not yet been given may be newly given to the new virtual server 11. The operating time management unit 23 may manage the operating time of the virtual server 11 based on this newly-given VMID.

It is envisaged that the new virtual server 11 generated by scale-out uses software used on the virtual server 11 before the scale-out. In this case, the VM software control unit 15 of the above-described new virtual server 11 installs the above-described software in response to the generation of the new virtual server 11.

Therefore, the operating time management unit 23 may manage the operating time of the virtual server 11 as the use time of the software. The clock time when the auto-scaling control unit 13 has scaled out the virtual server 11 (operation start clock time of the newly-generated virtual server 11) may be easily recognized.

Due to the management of the operating time of the virtual server 11 as the use time of software used on the virtual server 11 by the operating time management unit 23, facilitation of management of the software use time by the operating time management unit 23 is intended.

Furthermore, the operating time management unit 23 may manage a time based on the operation status of software that is operating on the virtual server 11 as the operating time of this software.

For example, the VM software control unit 15 of the new virtual server 11 generated by scale-out monitors the process of the new virtual server 11 and recognizes the time from activation of the process of software to the end. The VM software control unit 15 notifies the recognized time to the management server unit 12.

The operating time management unit 23 may manage a time notified from the virtual server 11 as the operating time of software.

<One Example of Management Server Storing Unit>

Figure 2:
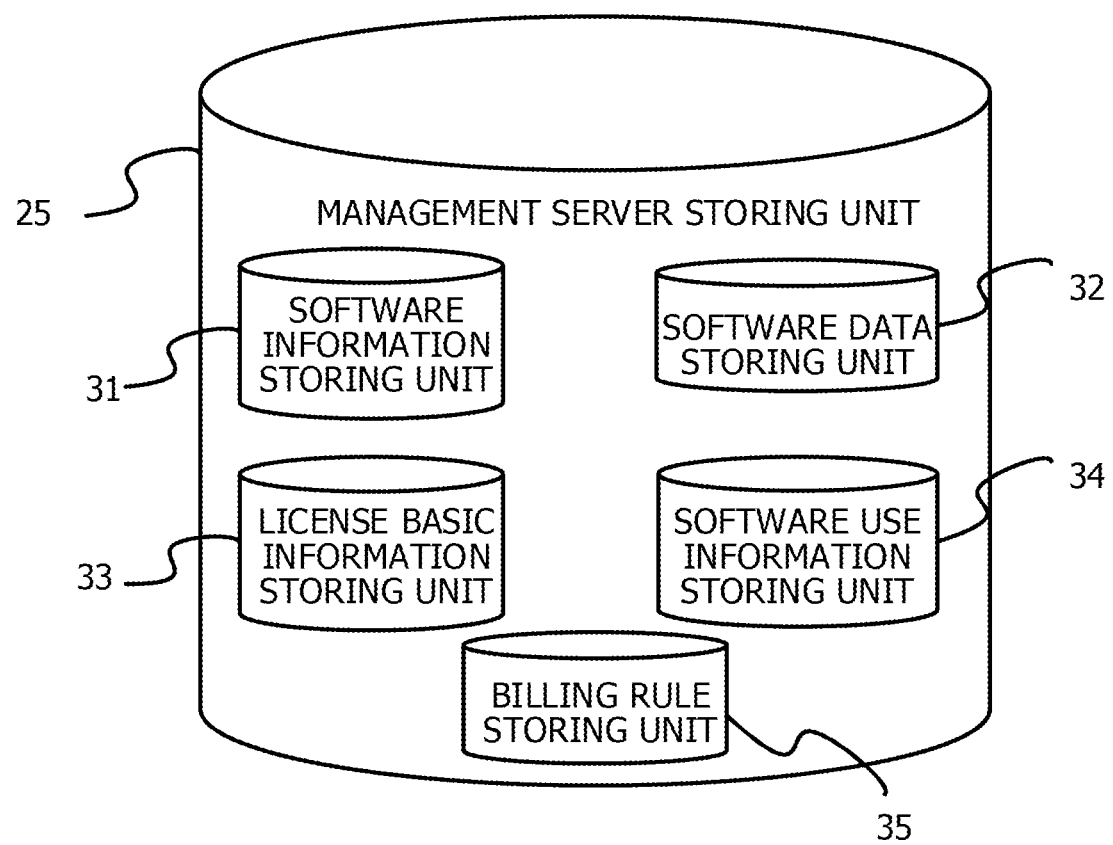
FIG. 2 is a diagram illustrating one example of a management server storing unit.

With reference to FIG. 2, one example of a management server storing unit will be described. The management server storing unit illustrated in FIG. 2 may be the management server storing unit 25 illustrated in FIG. 1. The management server storing unit 25 includes a software information storing unit 31, a software data storing unit 32, a license basic information storing unit 33, a software use information storing unit 34, a billing rule storing unit 35.

The software information storing unit 31 stores list information (for example, catalog or the like) of software that may be used with a pay-for-use billing license. The software data storing unit 32 stores an installer for installing software.

If plural pieces of software that may be used with a pay-for-use billing license are offered, the software data storing unit 32 stores installers corresponding to the respective pieces of software. The software data storing unit 32 may store not the installer of software but the entity data of the software.

The license basic information storing unit 33 stores basic information about the pay-for-use billing license of software that may be used on the virtual server 11. For example, the license basic information may include the billing amount of each billing type of pay-for-use billing, information on whether or not to disclose the software, and so forth.

The software use information storing unit 34 stores use information indicating the use status of software based on the license regarding each virtual server 11. This use information includes information indicating software that is being used on the virtual server 11 (software based on the license) and information relating to the operating time of the software.

For example, the operating time management unit 23 may store the operating time of the virtual server 11 or the operating time of software that operates on the virtual server 11 in the software use information storing unit 34.

The billing rule storing unit 35 stores billing rules indicating the billing amount according to the billing type of pay-for-use billing. For example, a billing rule that the billing amount of the hourly-amount pay-for-use billing license is lower than the billing amount of the monthly-amount pay-for-use billing license is stored in the billing rule storing unit 35.

Furthermore, the billing rule storing unit 35 may store information relating to a discount about the billing amount of a pay-for-use billing license regarding a given period.

<Screen Example>

Next, description will be made about a screen example displayed on the client terminal 3 when the client terminal 3 uses a cloud computing service offered by the service infrastructure 2. The client terminal 3 accepts operation by a user and transmits a request for login to the portal site unit 21 of the service infrastructure 2.

The portal site unit 21 carries out authentication based on this request. If the authentication succeeds, the portal site unit 21 permits the client terminal 3 to use the above-described cloud computing service. As described above, plural virtual servers 11 are generated in the service infrastructure 2 in some cases.

For example, suppose that operation of specifying the virtual server 11 to be used is carried out. The client terminal 3 accepts this specifying operation and accesses the specified virtual server 11 (for example, virtual server 11 identified based on a VMID).

The VM software control unit 15 of the virtual server 11 may cause the screen unit 3A of the client terminal 3 to display a list of pieces of software that may be used on the virtual server 11 and a screen to select software to be used from this list (software selection screen).

Figure 3:
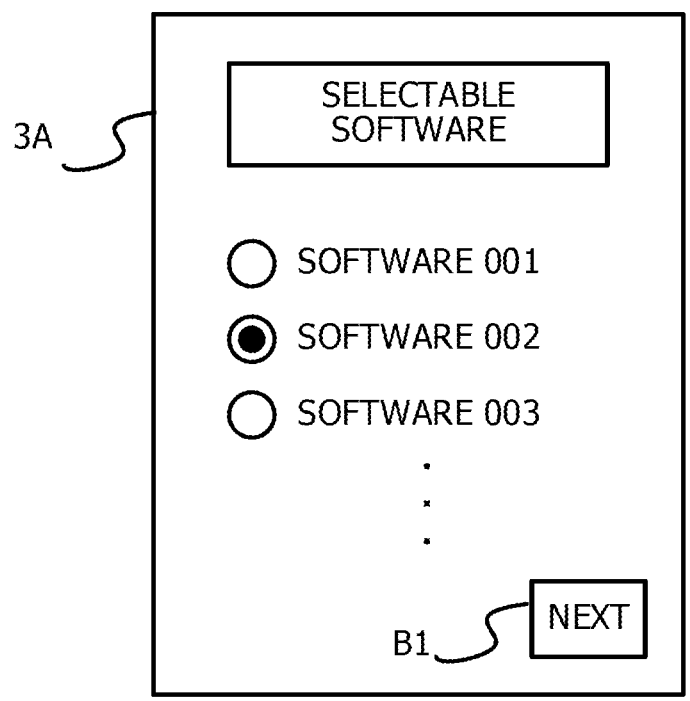
FIG. 3 is a diagram illustrating a screen example (first example)

For example, suppose that, as illustrated in an example of FIG. 3, the user operates the input unit 3B to carry out operation of selecting "software 002" and carry out operation of pressing down a button B1 of "next." The client terminal 3 accepts these operations.

The client terminal 3 transmits information indicating that "software 002" is selected to the virtual server 11. The VM software control unit 15 refers to the license basic information storing unit 33 and recognizes the billing type of pay-for-use billing.

As described above, in the embodiment, the flat-rate BYOL and the pay-for-use billing license exist as the license of software used on the virtual server 11. Furthermore, as the pay-for-use billing license, the monthly-amount pay-for-use billing license and the hourly-amount pay-for-use billing license exist.

Figure 4:
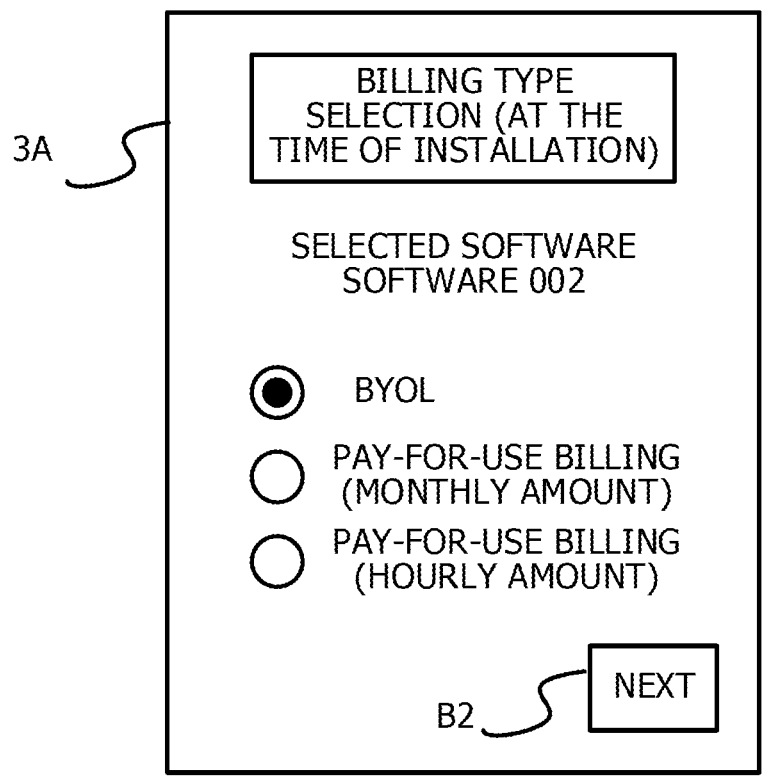
FIG. 4 is a diagram illustrating a screen example (second example)

FIG. 4 illustrates one example of a license selection screen to select a license to be used when software is installed on the virtual server 11. The license selection screen is a screen for selecting any of BYOL, pay-for-use billing (monthly amount), and pay-for-use billing (hourly amount).

The pay-for-use billing (monthly amount) represents a monthly-amount pay-for-use billing license and the pay-for-use billing (hourly amount) represents an hourly-amount pay-for-use billing license. For example, the license management unit 22 causes the selection screen of the license at the time of installation illustrated in the example of FIG. 4 to be displayed on the screen unit 3A of the client terminal 3.

In the example of FIG. 4, "BYOL" is selected. The client terminal 3 accepts pressing-down operation of a button B2 of "next." The client terminal 3 transmits, to the service infrastructure 2, information indicating that the license of "BYOL" is used at the time of installation regarding "software 002." At this time, the client terminal 3 may transmit the installer or entity data of "software 002" to the virtual server 11.

The VM software control unit 15 that operates on the virtual server 11 may make the state in which "software 002" may be used on the virtual server 11 by executing the received installer. Furthermore, the virtual server 11 may download the installer of "software 002" from the software data storing unit 32.

In the embodiment, the monthly-amount pay-for-use billing license or the hourly-amount pay-for-use billing license may be used based on selection by the user. For example, the pay-for-use billing license may be used if the user does not possess the BYOL.

For example, if "pay-for-use billing (monthly amount)" is selected in the example of FIG. 4, the VM software control unit 15 of the virtual server 11 acquires the installer of "software 002" from the software data storing unit 32.

The VM software control unit 15 executes the above-described installer, which enables the software of "software 002" to be used on the virtual server 11. This "software 002" is software permitted to be used on the virtual server 11 with use of the monthly-amount pay-for-use billing license.

Figure 5:
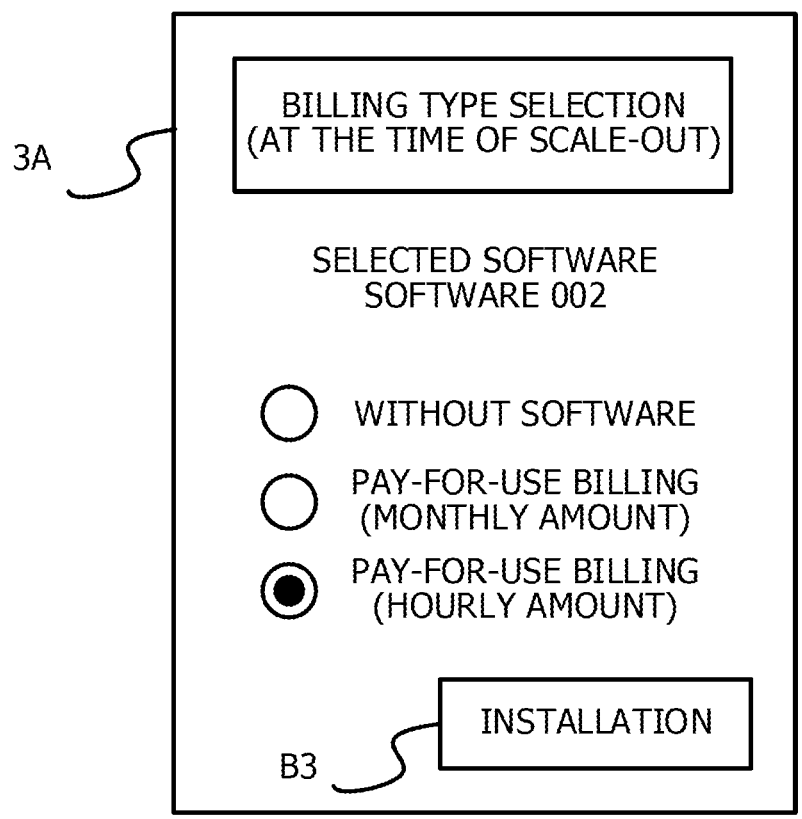
FIG. 5 is a diagram illustrating a screen example (third example)

Next, the VM software control unit 15 causes a selection screen of the license at the time of scale-out to be displayed on the screen unit 3A of the client terminal 3. FIG. 5 illustrates one example of a selection screen of a license at a time of scale-out.

As described above, if the load on the virtual server 11 surpasses a threshold, the auto-scaling control unit 13 scales out the virtual server 11. The new virtual server 11 is generated by this scale-out.

The selection screen of the license at the time of scale-out is a screen for selecting a license applied to the new virtual server 11 generated by the scale-out.

In the case of operating software of "software 002" on the newly-generated virtual server 11, a different license from the license of "software 002" that is operating on the virtual server 11 before the scale-out is used. FIG. 5 illustrates an example of a screen for selecting the license to be used for the new virtual server 11 when the virtual server 11 is scaled out (selection screen of the license at the time of scale-out).

As illustrated in the example of FIG. 5, if the virtual server 11 is newly generated by scale-out, any of "without software," "pay-for-use billing (monthly amount)," and "pay-for-use billing (hourly amount)" is selected.

"Without software" represents that, when the virtual server 11 is scaled out, the software used on the virtual server 11 before the scale-out is not used on the virtual server 11 newly generated according to the scale-out.

"Pay-for-use billing (monthly amount)" represents that the software used on the virtual server 11 before the scale-out is used on the virtual server 11 newly generated according to the scale-out with use of a monthly-amount pay-for-use billing license.

"Pay-for-use billing (hourly amount)" represents that the software used on the virtual server 11 before the scale-out is used on the virtual server 11 newly generated according to the scale-out with use of an hourly-amount pay-for-use billing license.

FIG. 5 illustrates an example in which "pay-for-use billing (hourly amount)" is selected. Furthermore, suppose that the client terminal 3 accepts operation of pressing down a button B3 of "next." The client terminal 3 transmits, to the service infrastructure 2, information indicating that the hourly-amount pay-for-use billing license is used at the time of scale-out regarding "software 002." The license management unit 22 recognizes that the hourly-amount pay-for-use billing license is used at the time of scale-out.

For example, it is envisaged that the load on the virtual server 11 surpasses the threshold if access temporarily concentrates on the virtual server 11. If the load on the virtual server 11 surpasses the threshold, the auto-scaling control unit 13 carries out control to scale out the virtual server 11.

The virtual server 11 is newly generated by this control. For example, if the concentration of access is temporary, the total of the load on the virtual server 11 before the scale-out and the load on the virtual server 11 newly generated according to the scale-out becomes equal to or lower than the threshold in a short time.

If the above-described total load becomes equal to or lower than the threshold, the auto-scaling control unit 13 carries out control to scale in the virtual server 11 newly generated according to the scale-out. The above-described newly-generated virtual server 11 is deleted according to this control.

In the above case, the virtual server 11 newly generated according to the scale-out is scaled in in a short time. Therefore, it is preferable that the license of the software applied to the virtual server 11 newly generated according to the scale-out be the pay-for-use billing license with which billing is carried out every shortest time.

In the above-described example, the pay-for-use billing license with which billing is carried out every shortest time is the hourly-amount pay-for-use billing license. The pay-for-use billing license with which billing is carried out every shortest time has the lowest billing amount.

It is envisaged that, if the virtual server 11 is scaled out due to temporary load concentration, the new virtual server 11 is scaled in in a short time. Therefore, the use time of software that operates on the new virtual server 11 generated according to the scale-out is short. In the above-described case, the hourly-amount pay-for-use billing license is selected.

On the other hand, the case is also possible in which the state in which the load on the virtual server 11 is high continues for a long time. In this case, the software that operates on the virtual server 11 newly generated according to the scale-out is used for a long time. Therefore, "pay-for-use billing (monthly amount)" is selected in some cases.

In FIG. 3 to FIG. 5, the example in which selection of software and license is carried out based on screen operation is illustrated. However, software and license may be identified based on arbitrary information (for example, text data or the like) to identify software and license, for example. In this case, the information to identify software and license is transmitted from the client terminal 3 to the service infrastructure 2.

Figure 6:
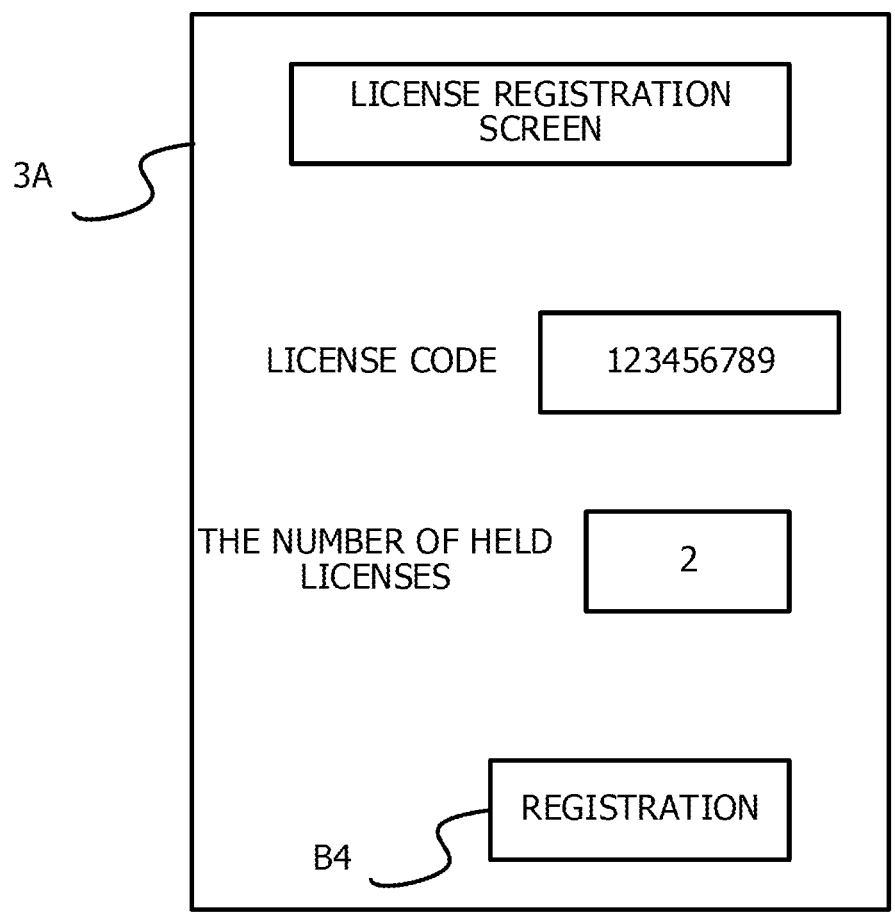
FIG. 6 is a diagram illustrating a screen example (fourth example)

Next, a registration screen of the BYOL will be described with reference to FIG. 6. For example, suppose that "BYOL" has been selected in the selection screen of the license at the time of installation. As described above, the BYOL is a license purchased by a user and software may be used on the virtual server 11 with use of this license.

Therefore, in the case of the BYOL, license information of the BYOL is registered in the management server unit 12. For example, if "BYOL" is selected in the selection screen of the license at the time of installation, the license management unit 22 causes a license registration screen illustrated in the example of FIG. 6 to be displayed on the screen unit 3A of the client terminal 3.

The user operates the input unit 3B to enter license information (license code) and the number of held licenses and presses down a registration button B4. The client terminal 3 accepts this operation. In the case of the example of FIG. 6, the license code about "software 002" is "123456789" and the number of licenses (the number of held licenses) of the software is "2."

The client terminal 3 transmits information indicating the above-described license information and the number of held licenses to the service infrastructure 2. If validity of the above-described license code is authenticated, the license management unit 22 recognizes that the number of held licenses of the BYOL about "software 002" is "2" and manages the number of held licenses.

The portal site unit 21 executes login processing as described above. When this login processing is executed, authentication is carried out by using information (for example, ID or the like) to identify the user. Therefore, the ID to identify the user may be associated with the above-described number of held licenses of the BYOL about "software 002."

<One Example of Auto-Scaling>

FIG. 7 illustrates one example of auto-scaling. Suppose that, in the example of FIG. 7, "software 002" has been selected and "BYOL" has been selected as the billing type selection at the time of installation and "pay-for-use billing (hourly amount)" has been selected as the pay-for-use billing license at the time of scale-out. Furthermore, suppose that the number of held licenses is registered as "1" in the license registration screen.

Suppose that the virtual server 11 before scale-out is virtual server A. For example, if access concentrates on "software 002" that operates on virtual server A, the load on virtual server A becomes high and the responsiveness of the virtual server A decreases.

If the load on the virtual server A surpasses a threshold, the auto-scaling control unit 13 scales out virtual server A. Virtual server B is newly generated according to this scale-out.

As described above, the software that operates on virtual server A is "software 002." On virtual server A, "software 002" is used with use of a BYOL about which the number of held licenses is "1."

Virtual server B generated according to the scale-out is a different virtual server from virtual server A. Therefore, a separate license is used in order to operate "software 002" on virtual server B.

As described above, the number of held licenses of "BYOL" about "software 002" is "1" and this "BYOL" is used for virtual server A. Thus, the number of remaining "BYOLs" about "software 002" is "0" and the license for using "software 002" on virtual server B is lacking.

In this case, the license management unit 22 determines that the number of used licenses of "software 002" is smaller than the number of held licenses.

As described above, using the hourly-amount pay-for-use billing license at the time of scale-out has been selected. The license management unit 22 applies the hourly-amount pay-for-use billing license to "software 002" used on virtual server B.

Therefore, the license of "software 002" is applied to both virtual server A and virtual server B and thus the occurrence of deficiency of the license is avoided. Accordingly, "software 002" is continuously used in both virtual server A and virtual server B.

Therefore, because virtual server A and virtual server B may continuously use "software 002," load balancing is intended and the decrease in the responsiveness is suppressed.

For example, if the above-described access concentration is temporary, the total of the load on virtual server A and the load on virtual server B becomes equal to or lower than the threshold after the elapse of a given time. If this total of the load becomes equal to or lower than the threshold, the auto-scaling control unit 13 scales in (deletes) virtual server B generated according to the scale-out.

When virtual server B is scaled in, the license of "software 002" applied to virtual server B becomes unnecessary. As described above, the license management unit 22 applies the hourly-amount pay-for-use billing license to "software 002" that operates on the virtual server B.

The hourly-amount pay-for-use billing license is the pay-for-use billing license with which billing is carried out at the shortest time intervals and is the pay-for-use billing license with the lowest amount. Therefore, due to the application of the pay-for-use billing license with the lowest amount to "software 002" that operates on virtual server B, the amount of billing to the user is suppressed.

Next, an example in which a pay-for-use billing license is applied to software that operates on virtual server A will be described. Suppose that, in an example of FIG. 8, "software 002" has been selected in the software selection screen.

Furthermore, suppose that not "BYOL" but "pay-for-use billing (monthly amount)" has been selected in the selection screen of the license at the time of installation and "pay-for-use billing (monthly amount)" has been selected in the selection screen of the license at the time of scale-out.

In this case, the selected monthly-amount pay-for-use billing license is applied to "software 002" that operates on virtual server A. On the other hand, in the case of operating "software 002" on the virtual server 11 newly generated according to scale-out, a surplus license applied to this "software 002" does not exist.

Therefore, when the auto-scaling control unit 13 has scaled out virtual server A, the license for operating "software 002" on new virtual server B generated is lacking.

As described above, using the hourly-amount pay-for-use billing license at the time of scale-out has been selected. The license management unit 22 permits "software 002" to operate on virtual server B with use of the hourly-amount pay-for-use billing license.

Therefore, the license of "software 002" is applied to both virtual server A and virtual server B and thus the occurrence of deficiency of the license is avoided. Accordingly, "software 002" is continuously used in both virtual server A and virtual server B.

Furthermore, if the total of the load on virtual server A and the load on virtual server B becomes equal to or lower than the threshold, the auto-scaling control unit 13 carries out control to scale in virtual server B. The auto-scaling control unit 13 preferentially scales in the virtual server on which software with use of the pay-for-use billing license of the shortest time operates based on information on the license managed by the license management unit 22.

In the case of the example of FIG. 8, the software that operates on virtual server A is software with use of the monthly-amount pay-for-use billing license and the software that operates on virtual server B is software with use of the hourly-amount pay-for-use billing license.

Accordingly, the auto-scaling control unit 13 carries out control to preferentially scale in virtual server B, on which the software with use of the hourly-amount pay-for-use billing license operates. Therefore, due to the application of the pay-for-use billing license with the lowest amount to "software 002" that operates on virtual server B to be scaled in, the amount of billing to the user is suppressed.

<Flowchart Illustrating One Example of Flow of Processing of Embodiment>

Figure 9:
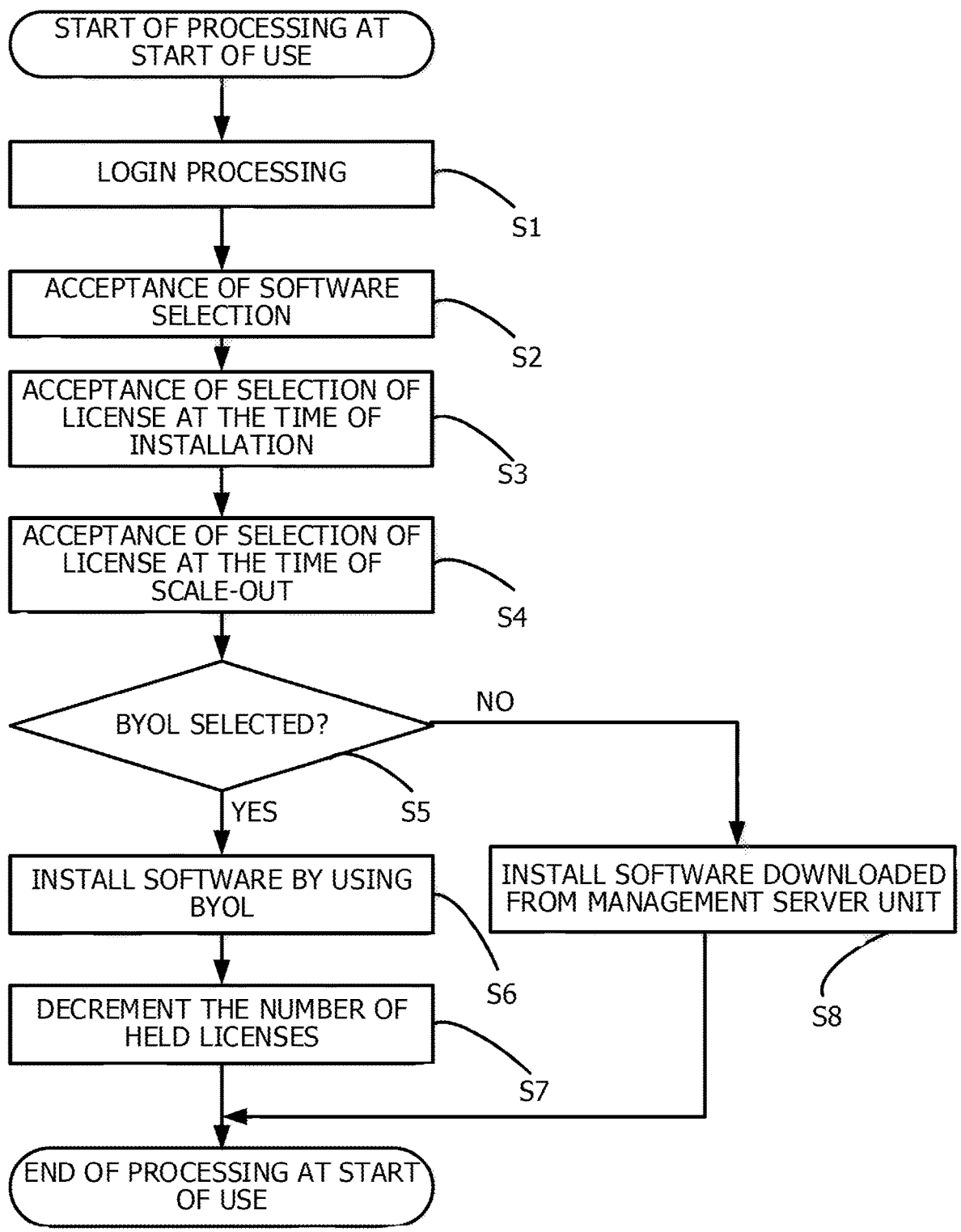
FIG. 9 is a flowchart illustrating one example of flow of processing at start of use.

One example of a flow of processing at a start of use will be described with reference to FIG. 9. A user operates the input unit 3B of the client terminal 3 to carry out login operation for using the service infrastructure 2. The client terminal 3 accepts this login operation.

The portal site unit 21 executes login processing based on this login operation (step S1). If the login succeeds, the portal site unit 21 may refer to the software use information storing unit 34 and display a list of pieces of software that have been installed on the screen unit 3A of the client terminal 3 regarding each virtual server 11.

If the login succeeds, the user is identified. Therefore, the virtual server 11 used by the client terminal 3 operated by this user is also identified.

For example, if plural virtual servers 11 are used by the above-described user, the portal site unit 21 may collectively display, on the client terminal 3, lists of pieces of software that have been installed about the respective virtual servers 11 corresponding to this user.

The client terminal 3 accesses the virtual server 11. The VM software control unit 15 of the virtual server 11 carries out control to cause the software selection screen to be displayed on the screen unit 3A of the client terminal 3.

When accepting selection operation of software, the client terminal 3 transmits information indicating the selected software to the virtual server 11. The VM software control unit 15 accepts the selection of the software (step S2).

The license management unit 22 carries out control to cause the selection screen of the license at the time of installation to be displayed on the screen unit 3A of the client terminal 3.

When accepting the selection operation of the license at the time of installation, the client terminal 3 transmits information indicating the selected license to the service infrastructure 2. The license management unit 22 accepts the selection of the license at the time of installation (step S3).

The license management unit 22 carries out control to cause the selection screen of the license at the time of scale-out to be displayed on the screen unit 3A of the client terminal 3.

When accepting the selection operation of the license at the time of scale-out, the client terminal 3 transmits information indicating the selected license to the service infrastructure 2. The license management unit 22 accepts the selection of the license at the time of scale-out (step S4).

The license management unit 22 determines whether a BYOL has been selected as the license at the time of installation (step S5). In the case of YES in the step S5, the VM software control unit 15 of the virtual server 11 downloads the software on the virtual server 11 by using the BYOL (step S6).

The VM software control unit 15 may execute an installer downloaded from the software data storing unit 32 to download the software on the virtual server 11. The VM software control unit 15 may execute an installer received from the client terminal 3 to download the software on the virtual server 11.

When the software is downloaded on the virtual server 11, the license management unit 22 decrements the number of held licenses of the BYOL (step S7).

In the case of NO in the step S5, not a BYOL but a pay-for-use billing license has been selected. Therefore, the VM software control unit 15 downloads an installer from the software data storing unit 32 of the management server unit 12.

The VM software control unit 15 executes the downloaded installer and thereby the software is installed on the virtual server 11 (step S8). The license of this software is the pay-for-use billing license.

Figure 10:
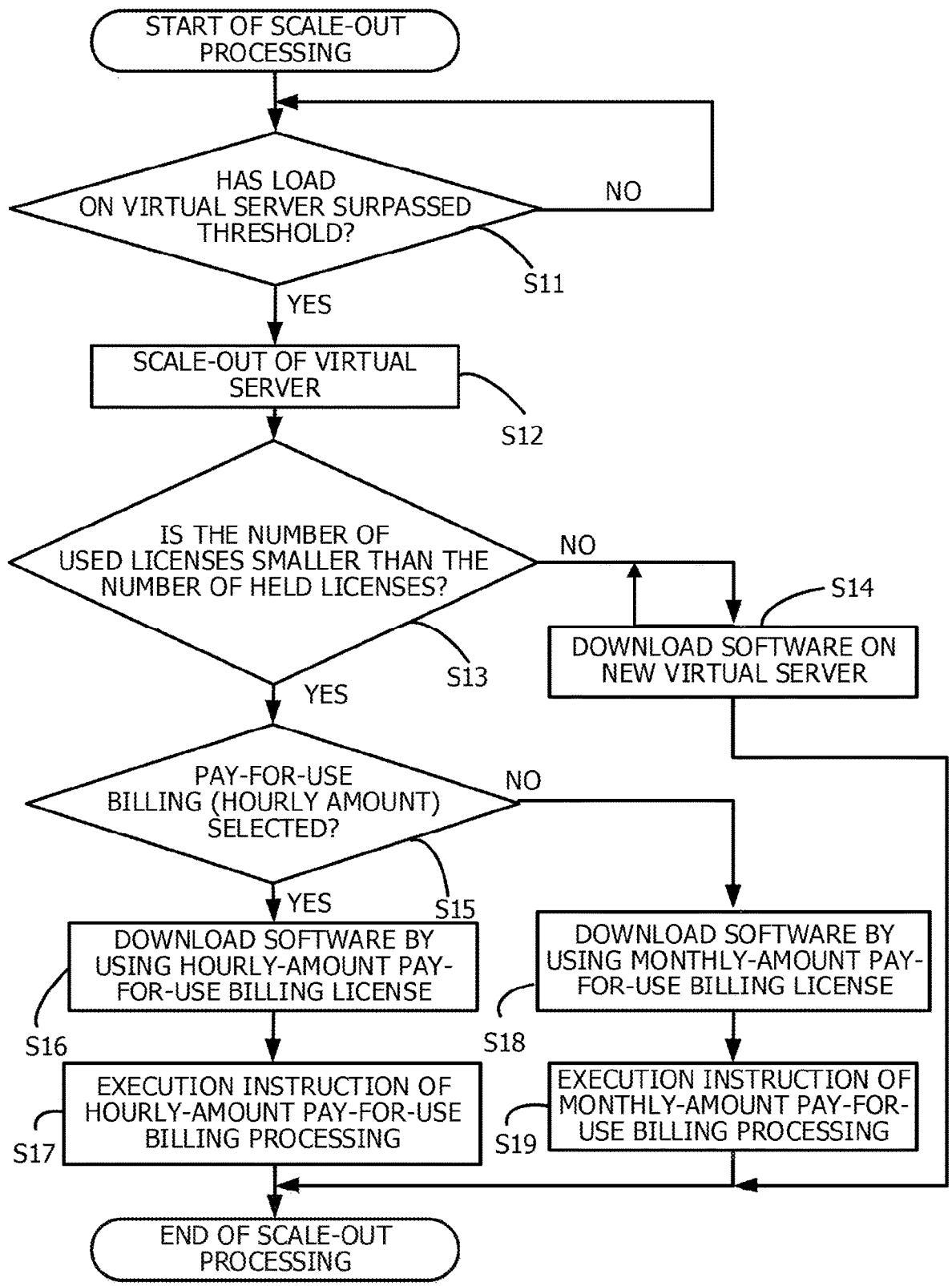
FIG. 10 is a flowchart illustrating one example of flow of scale-out processing.

Next, scale-out processing will be described with reference to FIG. 10. The auto-scaling control unit 13 determines whether the load on the virtual server 11 has surpassed a given threshold (step S11). In the case of NO in the step S11, the processing does not proceed to the next step.

In the case of YES in the step S11, the auto-scaling control unit 13 detects an event relating to scale-out. In this case, control to scale out the virtual server 11 is carried out. The new virtual server 11 is generated according to this scale-out (step S12).

The license management unit 22 determines whether the number of used licenses regarding the license about the software that is operating on the virtual server 11 before the scale-out is smaller than the number of held licenses regarding this license (step S13).

For example, the use states of each piece of software managed by the license management unit 22 is stored in the software use information storing unit 34 by the license management unit 22 according to change in this use status. The license management unit 22 may carry out the determination of the step S13 with reference to the software use information storing unit 34.

If plural BYOLs are registered, the number of held BYOLs is the plural number. For example, if the number of held BYOLs is "2," one BYOL is applied to the software that operates on the virtual server 11.

Therefore, even when the virtual server 11 is scaled out and the new virtual server 11 is generated, the remaining one BYOL is applied to software that operates on the new virtual server 11. In this case, the number of used licenses is not smaller than the number of held licenses.

If the number of held BYOLs is "1" or a pay-for-use billing license has been selected in the selection screen of the license at the time of installation, the license is lacking when the new virtual server 11 is generated according to the scale-out of the virtual server 11. In this case, the number of used licenses is smaller than the number of held licenses.

If the number of used licenses is not smaller than the number of held licenses (NO in the step S13), the VM software control unit 15 downloads the software on the virtual server 11 by using the BYOL (step S14).

If the number of used licenses is smaller than the number of held licenses (YES in the step S13), the number of licenses of the software that operates on the virtual server 11 newly generated according to the scale-out is insufficient. Therefore, the license management unit 22 applies a pay-for-use billing license to the virtual server 11 newly generated according to the scale-out.

Even if the number of held licenses is insufficient, the software may be continuously used because the pay-for-use billing license is applied to the software used on the newly-generated virtual server 11.

The license management unit 22 determines whether an hourly-amount pay-for-use billing license has been selected in the selection screen of the license at the time of scale-out (step S15). In the case of YES in the step S15, the selected pay-for-use billing license is an hourly-amount pay-for-use billing license.

The VM software control unit 15 downloads the software from the software data storing unit 32 by using the hourly-amount pay-for-use billing license (step S16) and installs this software on the virtual server 11.

The execution instruction output unit 24 outputs an execution instruction of hourly-amount pay-for-use billing to the billing processing unit 14 based on control by the license management unit 22 (step S17). The billing processing unit 14 carries out pay-for-use billing every one hour.

In the case of NO in the step S15, the selected pay-for-use billing license is a monthly-amount pay-for-use billing license. The VM software control unit 15 downloads the software from the software data storing unit 32 by using the monthly-amount pay-for-use billing license (step S18) and installs this software on the virtual server 11.

The execution instruction output unit 24 outputs an execution instruction of monthly-amount pay-for-use billing to the billing processing unit 14 based on control by the license management unit 22 (step S19). The billing processing unit 14 carries out pay-for-use billing every one month. Therefore, the software based on the monthly-amount pay-for-use billing license is used on the virtual server 11 newly generated according to the scale-out.

Figure 11:
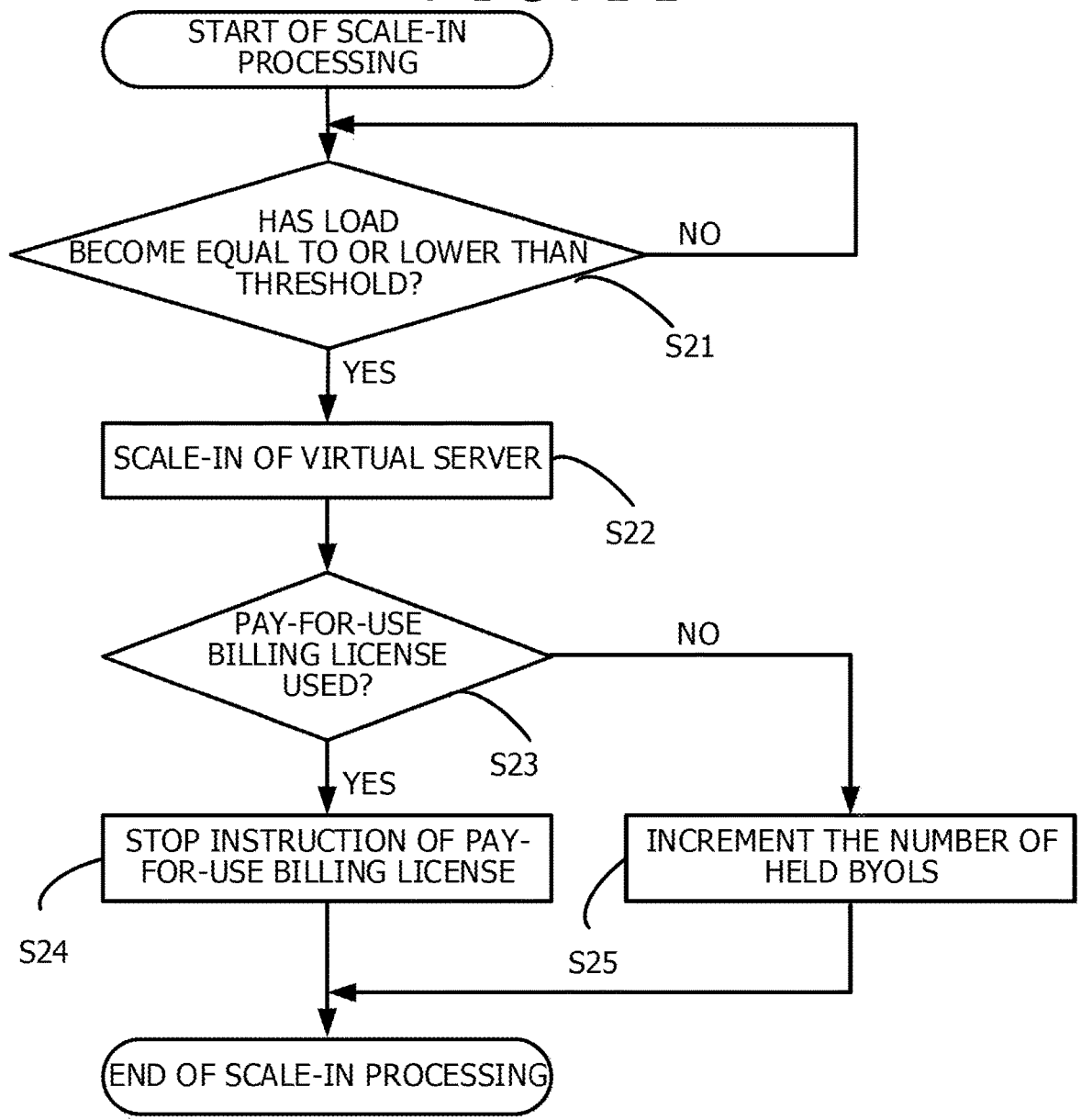
FIG. 11 is a flowchart illustrating one example of flow of scale-in processing.

Next, scale-in processing will be described with reference to FIG. 11. The auto-scaling control unit 13 determines whether the total load on the virtual server 11 before scale-out and the virtual server 11 newly generated according to the scale-out has become equal to or lower than a threshold (step S21).

In the case of NO in the step S21, the processing does not proceed to the next step. In the case of YES in the step S21, the virtual server 11 is deleted by carrying out control to scale in the virtual server 11 (step S22).

The license management unit 22 determines whether the software that has operated on the scaled-in virtual server 11 is software with use of a pay-for-use billing license (step S23).

In the case of YES in the step S23, the license management unit 22 outputs a stop instruction of pay-for-use billing processing to the billing processing unit 14 (step S24). The billing processing unit 14 stops the above-described pay-for-use billing processing based on this stop instruction.

In the case of NO in the step S23, in response to the scale-in of the virtual server 11, the software that has operated on the virtual server 11 is also deleted. Therefore, the license management unit 22 increments the number of held BYOLs (step S25).

Figure 12:
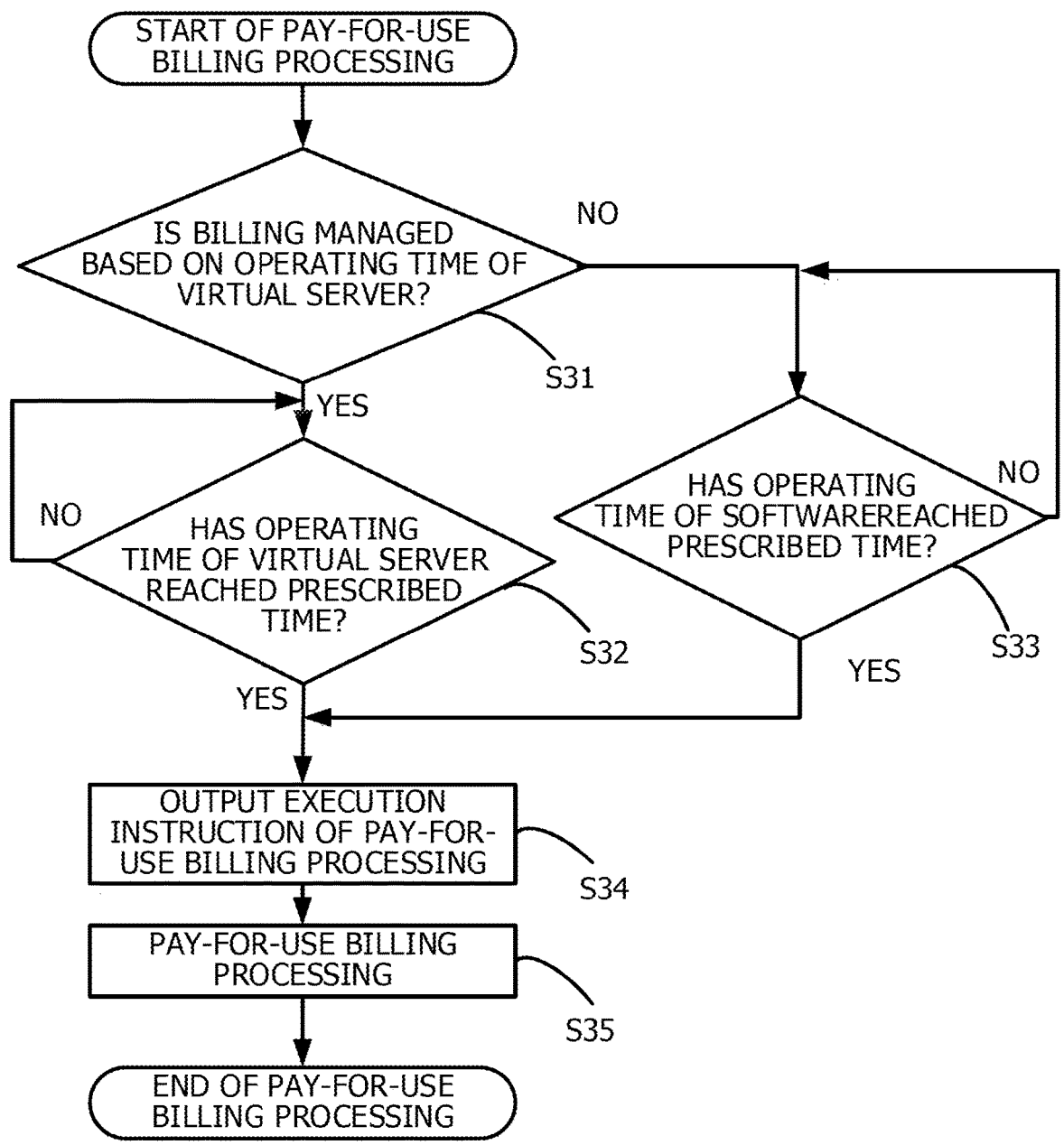
FIG. 12 is a flowchart illustrating one example of flow of pay-for-use billing processing.

Next, one example of pay-for-use billing processing will be described with reference to FIG. 12. The pay-for-use billing processing is processing of carrying out billing according to the use time of software. As described above, as the use time (operating time) of software, the operating time of the virtual server 11 may be employed or the operating time of the software may be employed.

If pay-for-use billing is managed based on the operating time of the virtual server 11 (YES in a step S31), the operating time management unit 23 determines whether the operating time of the virtual server 11 has reached a prescribed time (step S32). This prescribed time corresponds to the time interval at which the pay-for-use billing is carried out.

The operating time management unit 23 monitors the time from generation of the virtual server 11 due to scale-out and determines whether the operating time of the virtual server 11 has reached the prescribed time. In the case of NO in the step S32, the processing does not proceed to the next step.

In the case of YES in the step S32, the execution instruction output unit 24 outputs an execution instruction of pay-for-use billing processing to the billing processing unit 14 based on control by the license management unit 22 (step S34). The billing processing unit 14 executes the pay-for-use billing processing based on this execution instruction (step S35). At this time, the billing processing unit 14 executes the billing processing with reference to the billing rule storing unit 35 that stores billing rules.

If the pay-for-use billing is managed based on the operating time of software that operates on the virtual server 11 (NO in the step S31), the VM software control unit 15 monitors the process of the software among the processes of the virtual server 11.

The VM software control unit 15 periodically notifies the operation status of the software to the license management unit 22 based on information on the process of the monitoring target. The license management unit 22 manages the operating time of the software that operates on the virtual server 11 based on this notification.

The license management unit 22 determines whether the operating time of the software has reached the prescribed time based on the process of the software (step S33). In the case of NO in the step S33, the processing does not proceed to the next step. In the case of YES in the step S33, the processing makes a transition to the step S34.

MODIFICATION EXAMPLE

Figure 13:
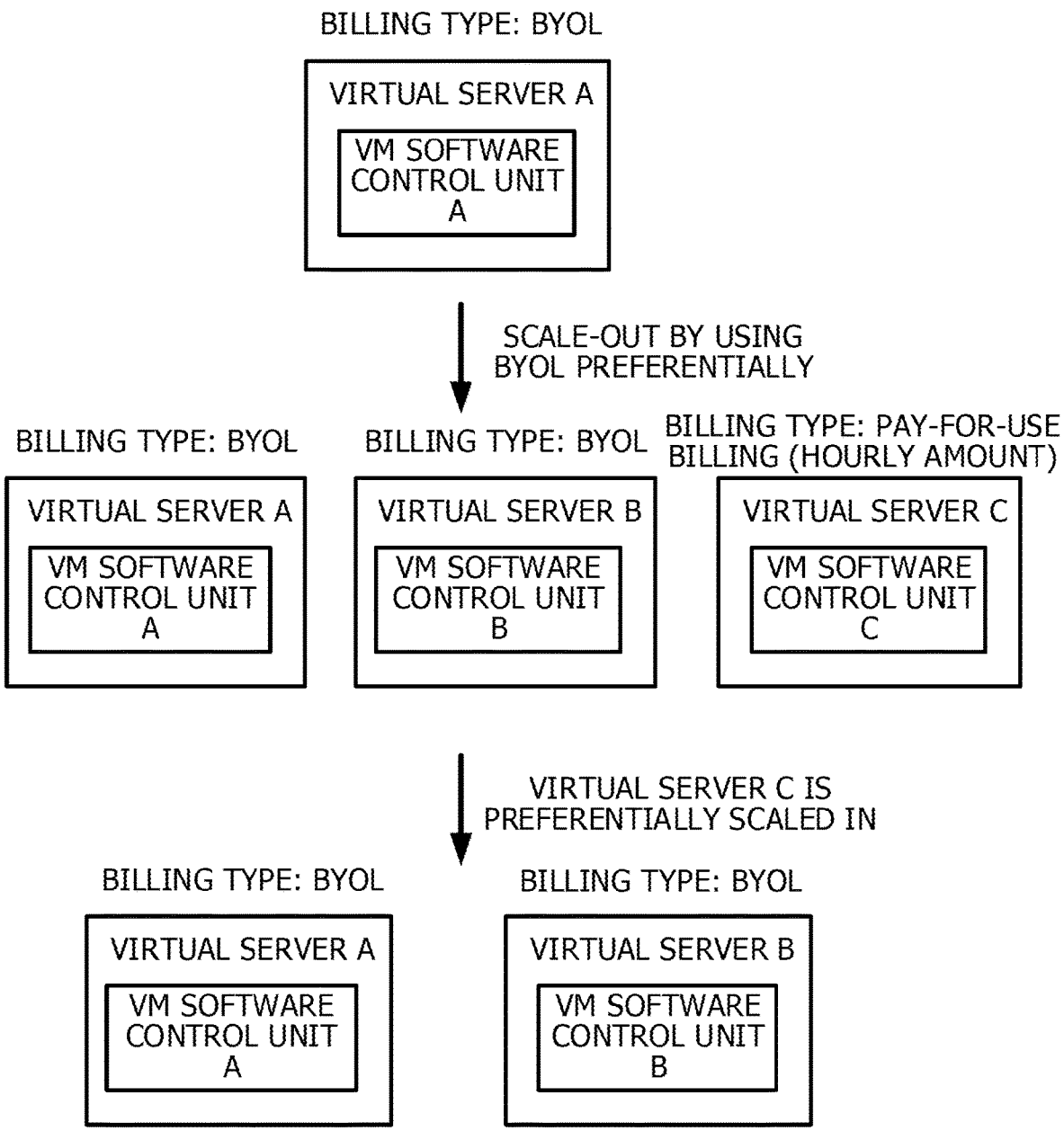
FIG. 13 is a diagram illustrating one example of auto-scaling in a modification example.

Next, a modification example will be described. Suppose that, as illustrated in an example of FIG. 13, virtual server A is scaled out and two virtual servers (virtual server B and virtual server C) are newly generated in response to increase in the load on the virtual server A to a high load. The virtual servers may be sequentially scaled out.

For example, if access on software that operates on virtual server A greatly increases in a short period, when only one virtual server B is scaled out, the load on virtual server A and virtual server B still surpasses the threshold in some cases.

In the above-described case, due to scale-out of two virtual servers (virtual server B and virtual server C), the load is balanced among three virtual servers and the load on the respective virtual servers becomes equal to or lower than the threshold in some cases. Depending on the load on virtual server A, three or more new virtual servers are scaled out in some cases.

In the modification example, the number of held BYOLs is "2." In this case, even if one BYOL is applied to virtual server A, one BYOL is left. Therefore, the remaining one BYOL is applied to virtual server B.

When the BYOL is applied to virtual server B, the number of held BYOLs becomes "0." Therefore, the license applied to software that operates on virtual server C is lacking. In this case, the license management unit 22 applies an hourly-amount pay-for-use billing license to the above-described software. Therefore, use of the software becomes possible continuously in virtual server C.

If the above-described access decreases, the total of the loads on virtual server A, virtual server B, and virtual server C becomes equal to or lower than the threshold. In this case, the auto-scaling control unit 13 carries out control of scale-in.

At this time, the auto-scaling control unit 13 preferentially scales in virtual server C, on which the software with use of the pay-for-use billing license operates, among the three virtual servers.

The BYOL is a license registered by the user and the pay-for-use billing license is a license with which separate billing is carried out to the user. Therefore, the amount of billing to the user is suppressed due to the scale-in of virtual server C, on which the software with use of the pay-for-use billing license operates, in virtual server B and virtual server C.

<One Example of Hardware Configuration of Service Infrastructure>

Next, one example of the hardware configuration of the service infrastructure 2 will be described with reference to an example of FIG. 14. As illustrated in the example of FIG. 14, a processor 111, a random access memory (RAM) 112, and a read only memory (ROM) 113 are coupled to a bus 100. Furthermore, an auxiliary storing device 114, a medium coupling unit 115, and a communication interface 116 are coupled to the bus 100.

The processor 111 executes a program loaded into the RAM 112. As the program to be executed, a control program that executes processing in the embodiment may be applied.

The ROM 113 is a non-volatile storing device that stores the program to be loaded into the RAM 112. The auxiliary storing device 114 is a storing device that stores various pieces of information, and hard disk drive, semiconductor memory, and so forth may be applied, for example. The medium coupling unit 115 is provided to be capable of being coupled to a portable recording medium 115M.

As the portable recording medium 115M, portable memory (for example, semiconductor memory), optical disc (for example, compact disc (CD) and digital versatile disc (DVD)), and so forth may be applied. The control program that executes processing in the embodiment may be recorded in the portable recording medium 115M.

The above-described virtual server 11, management server unit 12, auto-scaling control unit 13, and billing processing unit 14 may be implemented through execution of the given control program by the processor 111. Furthermore, the management server storing unit 25 may be implemented by the auxiliary storing device 114 or the like.

The RAM 112, the ROM 113, the auxiliary storing device 114, and the portable recording medium 115M are also one example of computer-readable tangible storage media. These tangible storage media are not a transitory medium such as a signal carrier wave.

<Others>

The present embodiment is not limited to the embodiments described above and various configurations or embodiments may be employed without departing from the gist of the present embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   generating a virtual machine when a processing load regarding one or more virtual machines on which a software runs exceeds a threshold;
   determining whether a number of flat-rate licenses of the software used for the one or more virtual machines is less than a predetermined number;
   selecting one pay-for-use billing license type of the software from among a plurality of pay-for-use billing license types of the software in which use times of the software for billing are different from each other when the number of flat-rate licenses is less than the predetermined number, to apply a pay-for-use billing license of the one pay-for-use billing license type to the generated virtual machine; and
   applying a flat-rate license of the software to the generated virtual machine when the number of flat-rate licenses is no less than the predetermined number.

2. The non-transitory computer-readable storage medium according to claim 1, wherein the predetermined number is a number of held first type licenses.

3. The non-transitory computer-readable storage medium according to claim 1, wherein the process further comprises:
   deleting a specified virtual machine included in the one or more virtual machines and the generated virtual machine when the processing load becomes less than the threshold, the specified virtual machine being a virtual machine to which a specified license is applied, the specified license corresponding to a smallest amount to use from among the plurality of pay-for-use billing license types.

4. A control method executed by a computer, the control method comprising:
   generating a virtual machine when a processing load regarding one or more virtual machines on which a software runs exceeds a threshold;
   determining whether a number of flat-rate licenses of the software used for the one or more virtual machines is less than a predetermined number;
   selecting one pay-for-use billing license type of the software from among a plurality of pay-for-use billing license types of the software in which use times of the software for billing are different from each other when the number of flat-rate licenses is less than the predetermined number, to apply a pay-for-use billing license of the one pay-for-use billing license type to the generated virtual machine; and
   applying a flat-rate license of the software the second type license to the generated virtual machine when the number of flat-rate licenses is no less than the predetermined number.

5. An information processing apparatus comprising:
   a memory; and
   a processor coupled to the memory and the processor configured to execute a process, the process comprising:
      generating a virtual machine when a processing load regarding one or more virtual machines on which a software runs exceeds a threshold;
      determining whether a number of flat-rate licenses of the software used for the one or more virtual machines is less than a predetermined number;
      selecting one pay-for-use billing license type of the software from among a plurality of pay-for-use billing license types of the software in which use times of the software for billing are different from each other when the number of flat-rate licenses is less than the predetermined number, to apply a pay-for-use billing license of the one pay-for-use billing license type to the generated virtual machine; and
      applying a flat-rate license of the software to the generated virtual machine when the number of flat-rate licenses is no less than the predetermined number.

* * * * *